United States Patent
Oh et al.

(10) Patent No.: US 11,095,727 B2
(45) Date of Patent: Aug. 17, 2021

(54) ELECTRONIC DEVICE AND SERVER FOR PROVIDING SERVICE RELATED TO INTERNET OF THINGS DEVICE

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Seok-jae Oh, Suwon-si (KR); Woo-ju Kim, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 225 days.

(21) Appl. No.: 15/245,809

(22) Filed: Aug. 24, 2016

(65) Prior Publication Data
US 2017/0180489 A1    Jun. 22, 2017

Related U.S. Application Data

(60) Provisional application No. 62/270,771, filed on Dec. 22, 2015.

(30) Foreign Application Priority Data

Apr. 25, 2016    (KR) .................. 10-2016-0050115

(51) Int. Cl.
*G06F 3/048*    (2013.01)
*H04L 29/08*    (2006.01)
*G06F 3/0488*   (2013.01)
*G06F 3/0484*   (2013.01)

(52) U.S. Cl.
CPC ............ *H04L 67/16* (2013.01); *G06F 3/0488* (2013.01); *G06F 3/04842* (2013.01); *H04L 67/12* (2013.01); *H04L 67/36* (2013.01); *H04L 67/10* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 9,228,835 B2* | 1/2016 | Gribkov | G01C 21/005 |
| 2010/0123737 A1* | 5/2010 | Williamson | G06T 15/20 |
| | | | 345/672 |
| 2011/0141141 A1* | 6/2011 | Kankainen | H04N 5/23216 |
| | | | 345/632 |

(Continued)

FOREIGN PATENT DOCUMENTS

| | | |
|---|---|---|
| KR | 10-1161241 B1 | 7/2012 |
| KR | 10-1560470 B1 | 10/2015 |

*Primary Examiner* — Hua Lu
(74) *Attorney, Agent, or Firm* — Sughrue Mion, PLLC

(57) ABSTRACT

An electronic device for providing a service related to an internet of things (IoT) device including: a display; and a controller configured to determine an IoT device list based on a location of the electronic device, control the display to display a marker in an area corresponding to the IoT device included in the IoT device list, and provide a service result corresponding to a service type of the IoT device based on an input for selecting the marker.

16 Claims, 9 Drawing Sheets

(56) References Cited

U.S. PATENT DOCUMENTS

| | | | |
|---|---|---|---|
| 2012/0194547 A1* | 8/2012 | Johnson | G06T 11/00 345/632 |
| 2013/0201214 A1* | 8/2013 | Piippo | G06F 3/14 345/633 |
| 2013/0207963 A1* | 8/2013 | Stirbu | G06F 3/04815 345/419 |
| 2014/0129387 A1* | 5/2014 | Kardell | G06Q 50/16 705/26.61 |
| 2014/0207282 A1* | 7/2014 | Angle | H04L 67/125 700/257 |
| 2015/0085669 A1* | 3/2015 | Prechner | H04W 24/10 370/241 |
| 2015/0094955 A1* | 4/2015 | Lee | H04W 4/021 701/532 |
| 2015/0195365 A1* | 7/2015 | Choi | H04W 4/021 715/739 |
| 2016/0036819 A1* | 2/2016 | Zehavi | H04W 4/70 726/4 |
| 2016/0063893 A1* | 3/2016 | Kanuganti | H04N 21/25841 348/62 |
| 2016/0100023 A1* | 4/2016 | Kim | H04L 67/141 709/227 |
| 2016/0167234 A1* | 6/2016 | Angle | B25J 13/006 701/2 |
| 2016/0226732 A1* | 8/2016 | Kim | H04W 12/04031 |
| 2016/0254946 A1* | 9/2016 | Prevost | H04B 17/318 455/420 |
| 2016/0274762 A1* | 9/2016 | Lopez | G06F 3/0488 |
| 2016/0285979 A1* | 9/2016 | Wang | H04L 67/125 |
| 2017/0004381 A1* | 1/2017 | Rantaeskola | H04W 4/70 |
| 2017/0041231 A1* | 2/2017 | Seed | H04L 47/10 |
| 2017/0046144 A1* | 2/2017 | Chen | G06F 9/45558 |
| 2017/0104928 A1* | 4/2017 | Chase | H04N 5/247 |
| 2017/0108838 A1* | 4/2017 | Todeschini | G06T 19/006 |
| 2017/0169614 A1* | 6/2017 | Tommy | G06F 3/0484 |
| 2017/0171607 A1* | 6/2017 | Britt | G06K 7/10722 |
| 2017/0238129 A1* | 8/2017 | Maier | H04W 4/02 455/404.2 |
| 2018/0027006 A1* | 1/2018 | Zimmermann | G06F 9/46 726/11 |
| 2018/0049101 A1* | 2/2018 | Dacosta | H04L 12/4625 |
| 2018/0206100 A1* | 7/2018 | Eisner | H04W 4/02 |

\* cited by examiner

ELECTRONIC DEVICE AND SERVER FOR PROVIDING SERVICE RELATED TO INTERNET OF THINGS DEVICE

CROSS-REFERENCE TO RELATED APPLICATIONS

This application claims the benefit of U.S. Provisional Application No. 62/270,771, filed on Dec. 22, 2015, in the US Patent Office and Korean Patent Application No. 10-2016-0050115, filed on Apr. 25, 2016, in the Korean Intellectual Property Office, the disclosures of which are incorporated herein in their entireties by reference.

BACKGROUND

1. Field

One or more exemplary embodiments relate to an electronic device and a server for providing a service related to an internet of things (IoT).

2. Description of the Related Art

As IoT technology develops, a necessity increases to control IoT devices providing various services. Different types of services may be provided by IoT devices. Accordingly, types of data obtained from IoT devices may be different and applications for respective services are required to use services provided by IoT devices.

Based on conventional IoT technology, protocols such as constrained application protocol (CoAP), message queue telemetry transport (MQTT) and extensible messaging and presence protocol (XMPP) can receive services from the IoT device when prior information such as internet protocol (IP) addresses, identification (ID), IoT device names, and keys are available. Thus, an amount of the prior information required to use the conventional IoT technology is enormous. In addition, when the prior information about the IoT device is not available, a problem exists that receiving services from the IoT device is difficult.

Exemplary embodiments may provide various services from IoT devices even when service types provided by IoT devices are different.

Exemplary embodiments may provide services related to the IoT device located in the vicinity of an electronic device even when the prior information about the IoT device is not available.

Exemplary embodiments may streamline controlling of IoT devices and processing of the IoT information, in the electronic device.

SUMMARY

Additional aspects will be set forth in part in the description which follows and, in part, will be apparent from the description, or may be learned by practice of the presented exemplary embodiments.

According to an exemplary embodiment, an electronic device providing a service related to an internet of things (IoT) device may include: a display unit; and a controller which determines an IoT device list based on a location of the electronic device, controls the display unit to display a marker in an area corresponding to the IoT device included in the IoT device list, and provides a service result corresponding to a service type of the IoT device based on an input for selecting the marker.

According to an exemplary embodiment, the controller may transmit the location of the electronic device to a server and receive from the server the IoT device list that has been determined, based on IoT device information stored in the server and the location of the electronic device.

According to an exemplary embodiment, the IoT device information may include the location of the IoT device and the service type of the IoT device.

According to an exemplary embodiment, the controller may control the display unit to display information that is generated or provided by the IoT device, when the service type includes information generation service or information utilization service.

According to an exemplary embodiment, the controller may control the display unit such that at least one of buttons is displayed for receiving a request for current status information of the IoT device and a control service, when the service type includes the control service.

According to an exemplary embodiment, the controller may transmit identification information of the IoT device to the server and receive from the server the service result of the IoT device, and the service result may include at least one of information generated by the IoT device, information provided by the IoT device, and status information of the IoT device.

According to an exemplary embodiment, the IoT device list may include at least one of the locations of the IoT device located in the vicinity of the electronic device, the identification information of the IoT device, the service type of the IoT device, information utilized by the IoT device, and the status information of the IoT device.

According to an exemplary embodiment, a server providing a service related to an IoT device may include: a memory storing IoT device information which includes a location of the IoT device and a service type of the IoT device; and a controller which transmits to an electronic device an IoT device list that is determined based on the location of the electronic device and IoT device information, in response to having received the location of the electronic device from the electronic device, and transmits to the electronic device a service result corresponding to the service type of the IoT device, in response to having received identification information of the IoT device from the electronic device.

According to an exemplary embodiment, the controller may request the service from the IoT device based on the identification information of the IoT device, and update the IoT device information based on a reply received from the IoT device, in response to the service requested.

According to an exemplary embodiment, the controller may transmit to the electronic device the service result of the IoT device based on the updated IoT device information, and the service result may include at least one of information generated by the IoT device, information provided by the IoT device, and status information of the IoT device.

According to an exemplary embodiment, the controller may generate identification information of the IoT device, and register the IoT device information which comprises the location of the IoT device, the service type of the IoT device, and the identification information that is received from the IoT device.

According to an exemplary embodiment, a method of providing a service related to an IoT device, the method may include: determining an IoT device list based on a location of an electronic device; controlling a display unit to display a marker in an area corresponding to the location of the IoT device that is provided in the IoT device list; and providing a service result corresponding to a service type of the IoT device based on an input for selecting the marker.

According to an exemplary embodiment, there is provided a method providing a service related to an IoT device at a server, the method my include: storing IoT device information that comprises a location of the IoT device and a service type of the IoT device; transmitting to an electronic device an IoT device list that is determined based on the location of the electronic device and the IoT device information, in response to having received the location of the electronic device from the electronic device; and transmitting to the electronic device a service result corresponding to the service type of the IoT device, in response to having received identification information of the IoT device from the electronic device.

According to an exemplary embodiment, there is provided an electronic device for providing a service related to an internet of things (IoT) device including: a display; and a controller configured to determine an IoT device list based on a location of the electronic device, control the display to display a marker in an area corresponding to the IoT device included in the IoT device list, and provide a service result corresponding to a service type of the IoT device based on an input for selecting the marker.

The controller may be further configured to transmit the location of the electronic device to a server, and receive, from the server, the IoT device list that has been determined based on IoT device information stored in the server and the location of the electronic device.

The IoT device information may include the location of the IoT device and the service type of the IoT device.

The controller may be further configured to, when the service type comprises information generation service or information utilization service, control the display to display information that is generated or provided by the IoT device.

The controller may be further configured to, when the service type comprises the control service, control the display such that at least one of buttons is displayed for receiving a request for current status information of the IoT device and a control service.

The controller may be further configured to transmit identification information of the IoT device to the server, and receive, from the server, the service result of the IoT device.

The service result may include at least one of information generated by the IoT device, information provided by the IoT device, and status information of the IoT device.

The IoT device list may include at least one of the locations of the IoT device located in the vicinity of the electronic device, the identification information of the IoT device, the service type of the IoT device, information utilized by the IoT device, and the status information of the IoT device.

According to an exemplary embodiment, there is provided a server for providing a service related to an internet of things (IoT) device including: a memory storing IoT device information, the IoT device information comprising a location of the IoT device and a service type of the IoT device; and a controller configured to transmit, in response to having received the location of the electronic device from an electronic device, an IoT device list to the electronic device, the IoT device list being determined based on the location of the electronic device and IoT device information, and transmit, in response to having received identification information of the IoT device from the electronic device, a service result to the electronic device, the service result corresponding to the service type of the IoT device.

The controller may be further configured to request the service from the IoT device based on the identification information of the IoT device, and update the IoT device information based on a reply received from the IoT device in response to the service requested.

The controller may be further configured to transmit, to the electronic device, the service result of the IoT device based on the updated IoT device information, and the service result comprises at least one of information generated by the IoT device, information provided by the IoT device, and status information of the IoT device.

The controller may be further configured to generate identification information of the IoT device, and register the IoT device information.

The IoT device information may include the location of the IoT device, the service type of the IoT device, and the identification information that is received from the IoT device.

According to an exemplary embodiment, there is provided a method of providing a service related to an internet of things (IoT) device, the method including: determining an IoT device list based on a location of an electronic device; controlling a display unit to display a marker in an area corresponding to the location of the IoT device that is provided in the IoT device list; and providing a service result corresponding to a service type of the IoT device based on an input for selecting the marker.

The determining the IoT device list may include: transmitting, to a server, the location of the electronic device; and receiving, from the server, the IoT device list that is determined based on IoT device information stored in the server, and the location of the electronic device.

The IoT device information may include the location of the IoT device and the service type of the IoT device.

The providing the service result may include controlling, when the service type comprises information generation service or information utilization service, the display unit to display information that is generated or provided by the IoT device.

The providing the service result may include controlling, when the service type comprises the control service, the display unit such that at least one of buttons is displayed for receiving a request for current status information of the IoT device and the control service.

The providing the service result may include: transmitting identification information of the IoT device to the server; and receiving the service result of the IoT device from the server.

The service result may include at least one of information generated by the IoT device, information provided by the IoT device, and state information of the IoT device.

The IoT device list may include at least one of the location of the IoT device that is located in the vicinity of the electronic device, the identification information of the IoT device, the service type of the IoT device, the information used by the IoT device, and the state information of the IoT device.

According to an exemplary embodiment, there is provided a method providing a service related to an internet of things (IoT) device at a server, the method including: storing IoT device information that comprises a location of the IoT device and a service type of the IoT device; transmitting, in response to having received the location of an electronic device from the electronic device, an IoT device list to an electronic device, the IoT device list being determined based on the location of the electronic device and the IoT device information; and transmitting, in response to having received identification information of the IoT device from the electronic device, a service result to the electronic device, the service result corresponding to the service type of the IoT device.

The transmitting the service result to the electronic device may include: requesting, from the IoT device, the service based on the identification information of the IoT device; and updating the IoT device information based on a reply received from the IoT device in response to the service requested.

The transmitting the service result to the electronic device may include transmitting, to the electronic device, the service result of the IoT device based on the updated IoT device information.

The service result may include at least one of information generated by the IoT device, information provided by the IoT device, and status information of the IoT device.

According to an exemplary embodiment, there is provided a non-transitory computer readable recording medium having recorded thereon a program for executing on a computer one or more method providing a service related to an internet of things (IoT) device.

BRIEF DESCRIPTION OF THE DRAWINGS

These and/or other aspects will become apparent and more readily appreciated from the following description of one or more exemplary embodiments, taken in conjunction with the accompanying drawings in which.

DETAILED DESCRIPTION

Figure 1:
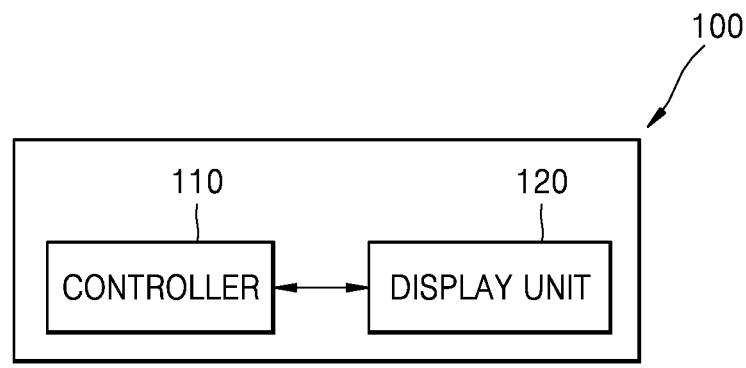
FIG. 1 is a block diagram of an electronic device according to an exemplary embodiment.

Reference will now be made in detail to one or more exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The attached drawings for illustrating exemplary embodiments of the inventive concept are referred to in order to gain a sufficient understanding of the inventive concept, the merits thereof, and the objectives accomplished by the implementation of the inventive concept. Hereinafter, the inventive concept will be described in detail by explaining certain exemplary embodiments of the inventive concept with reference to the attached drawings. Like reference numerals in the drawings denote like elements.

While such terms as "first," "second," etc., may be used to describe various components, such components must not be limited to the above terms. The above terms are used only to distinguish one component from another. For example, without leaving the scope of the specifications, a first component may be named as a second component and similarly, the second component may be named as the first component. Descriptions shall be understood to include any and all combinations of one or more of the associated listed items when the items are described by using the conjunctive term "~ or ~," "~ and/or ~," or the like, whereas descriptions shall be understood to include independent items only when the items are described by using the term "~ or one of ~."

The terms used in the present specification are merely used to describe certain exemplary embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 is a block diagram of an electronic device 100 according to an exemplary embodiment.

The electronic device 100 may be a device which provides a service related to an internet of things (IoT) device. The electronic device 100 may be, for example, a smart phone, a head mounted display (HMD), a head up display (HUD), a wearable device, a tablet personal computer (PC), a PC, a smart TV set, a lap top computer, a global positioning system (GPS), a digital broadcasting terminal, a navigation system, a Kiosk, a digital camera and other mobile or non-mobile computing apparatus; however, one or more exemplary embodiments are not limited thereto. In addition, the electronic device 100 may include an apparatus comprising an optical system which has a lens and a photographing device, shoots an object, and generates an image. In addition, the electronic device 100 may include a virtual reality (VR) device having a communication function, a data processing function, and providing a VR image, an augmented reality (AR) device providing an AR image, a watch, a pair of glasses, a hair band, and a ring.

Referring to FIG. 1, the electronic device 100 may include a controller 110 and a display unit 120, e.g., a display.

The controller 110 may determine an IoT device list based on a location of the electronic device 100.

The location of the electronic device 100 may be determined based on a gyroscope sensor, a location sensor (for example, the GPS), etc. which are included in the electronic device 100. In addition, the location of the electronic device 100 may include altitude, latitude, and longitude. In addition, the location of the electronic device 100 may include a bearing of the electronic device 100. In other words, the location of the electronic device 100 may include information about a direction toward which the electronic device 100 is facing.

The IoT device list may be a list of the IoT devices which are located in the vicinity of the electronic device 100. The vicinity of the electronic device 100 may an area in which the electronic device 100 can presently take a picture. The IoT device list may include at least one of a location of the IoT device, identification information of the IoT device, a service type of the IoT device, information used by the IoT device, and status information of the IoT device.

The electronic device 100 may determine the IoT device list based on the IoT device information. In addition, the electronic device 100 may determine the IoT device list based on the location of the electronic device 100 and the locations of the IoT devices included in the IoT device information.

The IoT device Information may include the location of the IoT device and the service type of the IoT device. In addition, the IoT device information may be information that is based on an ontology schema. A semantic sensor network (SSN) ontology which is an ontology model based on a service modeling for the IoT having been presented during the IoT-A Project, an ontology web language (OWL)-S service profile ontology, an OWL-S service grounding ontology, etc. may be used as ontology schemas. The IoT device information of the IoT device may comprise an instance of ontology. The instance of the ontology may be generated and updated via a server.

The electronic device 100 may determine the IoT device list based on the IoT device information which is stored in a memory of the electronic device 100.

In addition, the electronic device 100 may also receive the IoT device list from the server. In detail, the electronic device 100 may transmit the location of the electronic device 100 to the server. In addition, the electronic device 100 may receive from the server the IoT device list which is determined based on the IoT device information stored in the server and the location of the electronic device 100.

The controller 110 may control such that a marker is displayed in an area which corresponds to the location of the IoT device included in the IoT device list. The marker, which is displayed in the area corresponding to the location of the IoT device, may receive an input for selecting the IoT device. For example, a status of remaining of the marker in a certain area for longer than a certain time may denote the input for selecting the IoT device.

The controller 110 may provide a service result corresponding to the service type of the IoT device based on the input for selecting the marker.

The service type may include, for example, an information generation service, an information utilization service, and a control service.

The information generation service may denote generation of information at the IoT device. For example, when the IoT device is a temperature sensor, the service type of the temperature sensor may include the information generation service. The information generated via the information generation service of the temperature sensor may be an ambient temperature.

The information utilization service may denote acquisition of information based on data that is presently provided by the IoT device. For example, when the IoT device is a bus stop, the service type of the bus stop may include the information utilization service. The information acquired via the information utilization service at the bus stop may be a bus arrival time.

The control service may denote controlling current status based on current status information of the IoT device. For example, when the IoT device is a light emitting diode (LED), the service type of the LED may include the control service. The current status information which is acquired via the control service at the LED may be a current on/off status of the LED. In addition, the on/off status of the LED may be changed via the control service at the LED.

In addition, the service result may be information generated or provided by the IoT device. In addition, the service result may be the status information of the IoT device.

The controller 110 may directly receive the service result from the IoT device based on the IoT device information which is stored in the memory of the electronic device 100. In other words, the controller 110 may directly transmit a service request to the IoT device and receive a reply for the service request.

When the IoT device information in the memory of the electronic device 100 is not available, the controller 110 may receive the service result from the server via the identification information of the IoT device. In this case, the controller 110 may transmit the identification information of the IoT device to the server and receive the service result via the server.

The display unit 120 may display the marker in the area corresponding to the location of the IoT device.

In addition, the display unit 120 may display the marker displaying the location of the IoT device along with an image. The image to be displayed on the display unit 120 may be an image that has been shot via the electronic device 100. For example, the display unit 120 may display a stationary image or a live-view image of a video image currently in shooting via the electronic device 100. In addition, the image displayed on the display unit 120 may be at least one of images stored in the electronic device 100 and images received from an external device.

In addition, the display unit 120 may display the marker denoting the location of the IoT device along with an image in which the vicinity of the electronic device 100 is shot. The image in which the vicinity of the electronic device 100 is shot may be an augmented reality (AR) image; however, one or more exemplary embodiments are not limited thereto.

Figure 2:
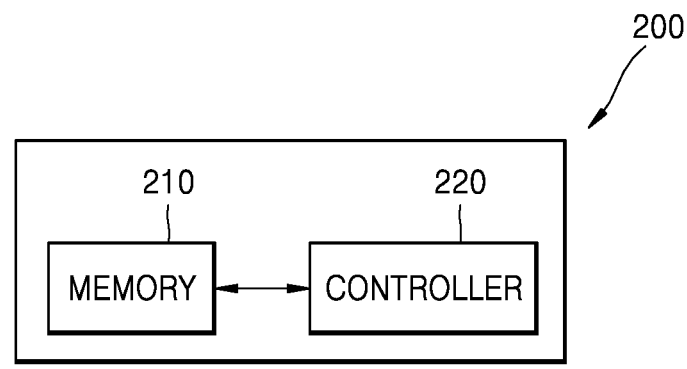
FIG. 2 is a block diagram of a server which is operable via a connection to the electronic device 100 according to an exemplary embodiment.

FIG. 2 is a block diagram of a server 200 which is operable via a connection to the electronic device 100 according to an exemplary embodiment.

Referring to FIG. 2, the server 200 may be a device which provides the service related to the IoT device. The server 200 may include a memory 210 and a controller 220.

The memory 210 may store the location of the IoT device and the IoT device information including the service type of the IoT device.

In addition, the IoT device information may include the location of the IoT device received from the IoT device, the service type of the IoT device, and the identification information of the IoT device.

The controller 220 may transmit to the electronic device 100 the IoT device list which is determined based on the location of the electronic device 100 and the IoT device information, in response to having received the location of the electronic device 100 from the electronic device 100.

The controller 220 may transmit to the electronic device 100 the service result corresponding to the service type of the IoT device, in response to having received the identification information of the IoT device from the electronic device 100.

The controller 220 may request a service from the IoT device based on the identification information of the IoT device. The controller 220 may update the IoT device information based on a reply to the service request received from the IoT device.

The controller 220 may transmit to the electronic device 100 the service result of the IoT device based on updated IoT device information. The service result may include at least one of information generated by the IoT device, information provided by the IoT device, and the status information of the IoT device.

The controller 220 may generate the identification information of the IoT device. For example, when the IoT device information in the memory 210 is not available, the controller 220 may generate the identification information of the IoT device. In other words, when the IoT device is a new device, the controller 220 may generate the identification information of the IoT device. In addition, the controller 220 may generate the IoT device information which includes the identification information of the IoT device. The controller 220 may register the generated IoT device information.

In addition, when the IoT device information stored in the memory 210 is available, the controller 220 may update the IoT device information based on the location of the IoT device received from the IoT device.

Figure 3:
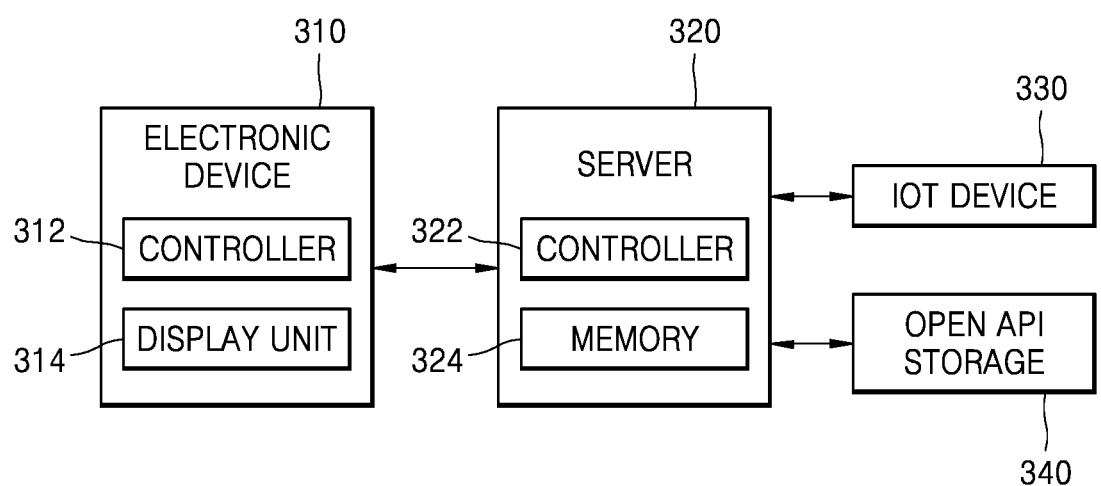
FIG. 3 illustrates a system for providing a service related to an internet of things (IoT) device according to an exemplary embodiment.

FIG. 3 illustrates a system for providing a service related to the IoT device according to an exemplary embodiment.

Referring to FIG. 3, the system for providing the service related to the IoT device may include an electronic device 310, a server 320, an IoT device 330, and an open application programming interface (OPEN API) storage 340.

The electronic device 310 may transceive data to and from the server 320. In addition, the electronic device 310 may include a controller 312 and a display unit 314. The controller 312 and the display unit 314 in FIG. 3 may respectively include functions corresponding to those of the controller 110 and the display unit 120 in FIG. 1. Descriptions of the controller 312 and the display unit 314 are a duplicate of those in FIG. 1 and will be omitted.

The server 320 may include a controller 322 and a memory 324. The controller 322 and the memory 324 in FIG. 3 may respectively include functions corresponding to those of the controller 220 and the memory 210 in FIG. 2. Descriptions of the controller 322 and the memory 324 are a duplicate of those in FIG. 2 and will be omitted.

The IoT device 330 may provide a representational state transfer (REST) service to allow the external device to access the IoT device 330. In addition, the IoT device 330 may provide the IoT device information of the IoT device 330 in a resource description framework (RDF) form. For example, the IoT device 330 may provide the IoT device information in the RDF form based on an ontology model provided by the server 320.

The OPEN API storage 340 may transmit data to the IoT device 330.

The OPEN API storage 340 may transmit data to the IoT device 330 via a predetermined communication protocol. For example, the communication protocol may include the CoAP, the MQTT, the REST, and a simple object access protocol (SOAP). The OPEN API storage 340 may determine whether the IoT device 330 is allowed to access data based on an API key which has been previously registered.

Figure 4:
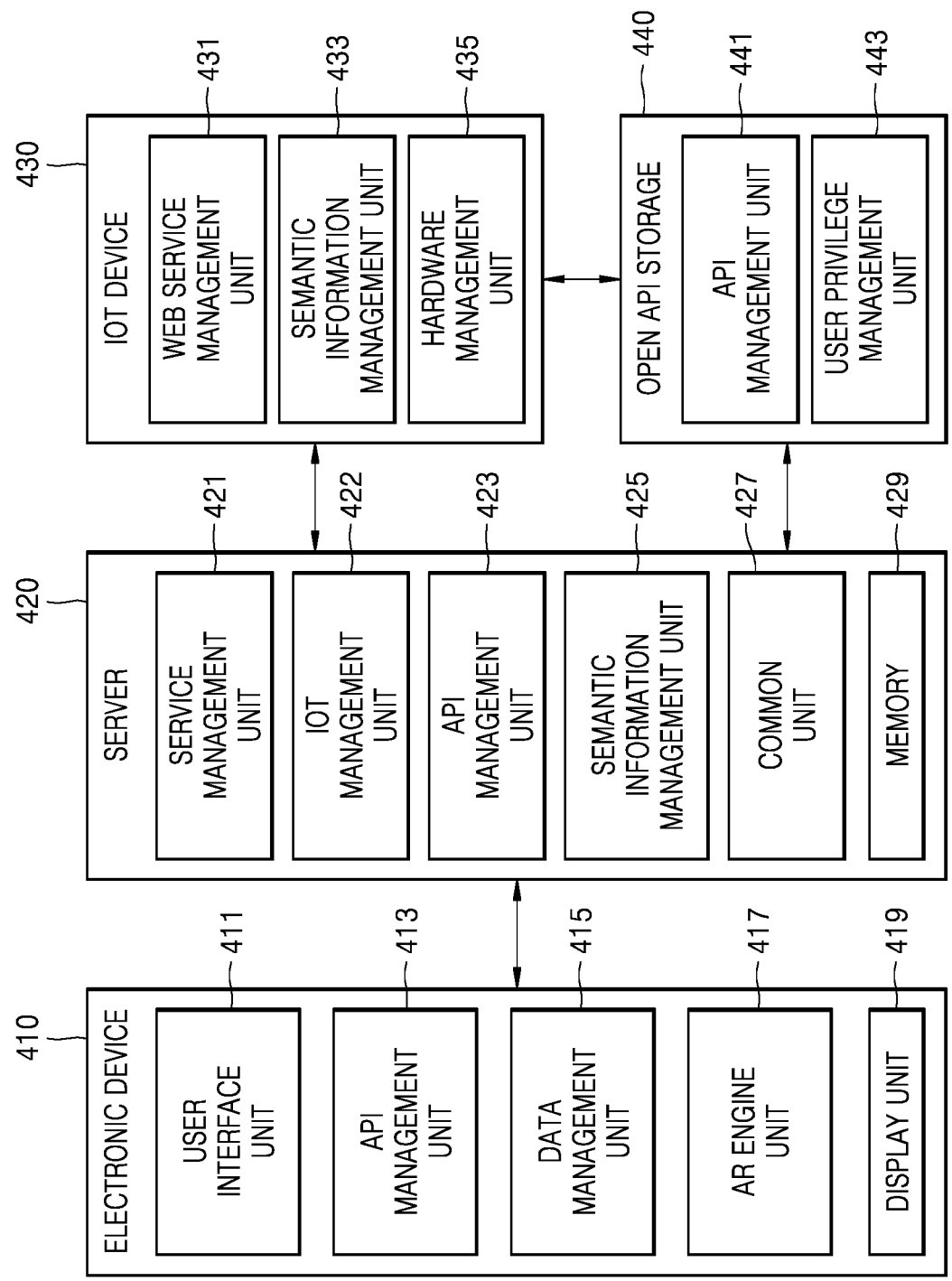
FIG. 4 illustrates another system for providing the service related to the IoT device according to an exemplary embodiment.

FIG. 4 illustrates a system for providing the service related to an IoT device according to another exemplary embodiment.

Referring to FIG. 4, the system for providing the service related to the IoT device may include an electronic device 410, a server 420, an IoT device 430, and an OPEN API storage 440.

The electronic device 410 may include a user interface unit 411, e.g., an interface, an API management unit 413, e.g., an API manager, a data management unit 415, e.g., a data manager, an AR engine 417, and a display unit 419.

The user interface unit 411 may control such that the marker is displayed in the area corresponding to the location of the IoT device 430. In addition, the user interface unit 411 may display the area for selecting the marker. For example, the area for selecting the marker may be displayed at the center part of the display unit 419 of the electronic device 410. In addition, the user interface unit 411 may display the area for selecting the marker as a rectangle at the center part of the display unit 419. An input for selecting the marker may correspond to a status that the marker remains inside the area for selecting the marker for more than a certain period of time.

When the service type of the IoT device 430 includes the information generation service or the information utilization service, the user interface unit 411 may control such that information generated at the IoT device 430 is displayed. In addition, when the service type of the IoT device 430 includes the control service, the user interface unit 411 may display at least one of buttons for receiving a request for the current status information and the control service of the IoT device 430.

The API management unit 413 may request a calling the OPEN API from the server 420. When the OPEN API is needed among services provided by the IoT device 430, the API management unit 413 may request the OPEN API from the server 420.

The data management unit 415 may manage data that is displayed along with the marker of the IoT device 430. For example, the data management unit 415 may manage whether data of the current status of the IoT device 430, data of the current location of the IoT device 430, the identification information of the IoT device 430, the service type of the IoT device 430, and data of a name of the IoT device 430 are to be displayed.

In addition, the data management unit 415 may manage the location of the electronic device 410 and data stored in the electronic device 410.

The AR engine 417 may realize the augmented reality (AR) based on the location of the electronic device 410. The AR engine 417 may display the marker corresponding to the location of the IoT device 430 based on the location of the electronic device 410.

In addition, the AR engine 417 may display the area for selecting the marker by superimposing the area over the image. For example, the area for selecting the marker may be displayed at the center part of the display unit 419 of the electronic device 410. The AR engine 417 may determine whether the marker enters the area for selecting the marker.

According to an exemplary embodiment, the AR engine 417 may include the Mixare open source AR engine; however, one or more exemplary embodiments are not limited thereto. The Mixare is a general public license (GPL) v. 3 and may be realized in the Android and the iPhone operating system (iOS) environments.

Since the display unit 419 identically corresponds to the display unit 120 described in FIG. 1, a description of the display unit 419 will be omitted.

When the service type of the IoT device 430 is the information generation service, the electronic device 410 may receive from the server 420 information generated by the IoT device 430 according to an exemplary embodiment. In addition, when the service type of the IoT device 430 is the information utilization service, the electronic device 410 may receive from the server 420 information provided by the IoT device 430. For example, information received from the server 420 may be provided in an Android Toast format.

When the service type of the IoT device 430 is the control service, the electronic device 410 may display a button corresponding to the control service. When the button is selected, the electronic device 410 may show the service result in the Toast format.

When the electronic device 410 operates in the Android environment and requests the REST service from the server 420, a delay in operation of the electronic device 410 may occur according to an exemplary embodiment. In this case, the electronic device 410 may transceive data to and from the server 420 in the multi-thread background via an AsyncTask function. In other words, the electronic device 410 may not affect a user interface (UI) on a main screen by operating the server 420 in the multi-thread background.

The server 420 may control a total system and manage total data.

The server 420 may include a service management unit 421, an IoT management unit 422, an API management unit 423, a semantic information management unit 425, a common management unit 427, and a memory 429.

The service management unit 421 may provide the IoT device list. In addition, the service management unit 421 may provide the service upon a request from the electronic device 410, the service being provided by the IoT device 430.

The IoT management unit 422 may register the IoT device information of a first IoT device 430. In addition, the IoT management unit 422 may manage the service of the IoT device 430 per the service type.

The API management unit 423 may request an API from the IoT device 430 and reply to a request. According to an exemplary embodiment, when the IoT device 430 uses the OPEN API, public information may be linked.

The semantic information management unit 425 may generate and update the IoT device information. The semantic information management unit 425 may manage the IoT device information and update information included in the IoT device information. For example, the IoT device information may use the ontology. In addition, the ontology schema maybe generated via the Protégé program. The IoT device information may include location information, service information, user information, and service type of the IoT device. In addition, the IoT device information may include information that is generated and utilized by the IoT device and the current status information of the IoT device. The semantic information management unit 425 may continuously update the IoT device information via the ontology.

The common management unit 427 may perform a series of computations and supplementary processing.

The memory 429 identically corresponds to the memory 210 in FIG. 2 and a description of the memory 429 will be omitted.

According to an exemplary embodiment, the server 420 may be realized via the model-view-controller (MVC) model of the Spring Framework. In addition, the server 420 may use the Tomcat Web Server 8.0; however, the exemplary embodiment is not limited thereto.

The IoT device 430 may include a web service management unit 431, e.g., a web service manager, a semantic information management unit 433, e.g., a semantic information manager, and a hardware management unit 435, e.g., a hardware manager.

The web service management unit 431 may provide the REST service to allow the external device to access the IoT device 430.

The semantic information management unit 433 may provide the IoT device information of the IoT device 430 in a resource description framework (RDF) format. For example, the semantic information management unit 433 may provide the IoT device information in the RDF format based on the ontology model which is provided by the server 420. The semantic information management unit 433 may provide the IoT device information by using other formats except the RDF format.

The hardware management unit 435 may provide the service result or transfer information which is received from the outside. In addition, the hardware management unit 435 may control the IoT device 430.

The OPEN API storage 440 may transmit data to the IoT device 430.

The OPEN API storage 440 may include an API management unit 441 and a user privilege management unit 443, e.g., a user privilege manager. The API management unit 441 may transmit data to the IoT device 430 via a predetermined communication protocol. For example, the communication protocol may include the CoAP, the MQTT, the REST, and the SOAP. The user privilege management unit 443 may determine whether the IoT device 430 is allowed to access data based on a pre-registered API key.

Figure 5:
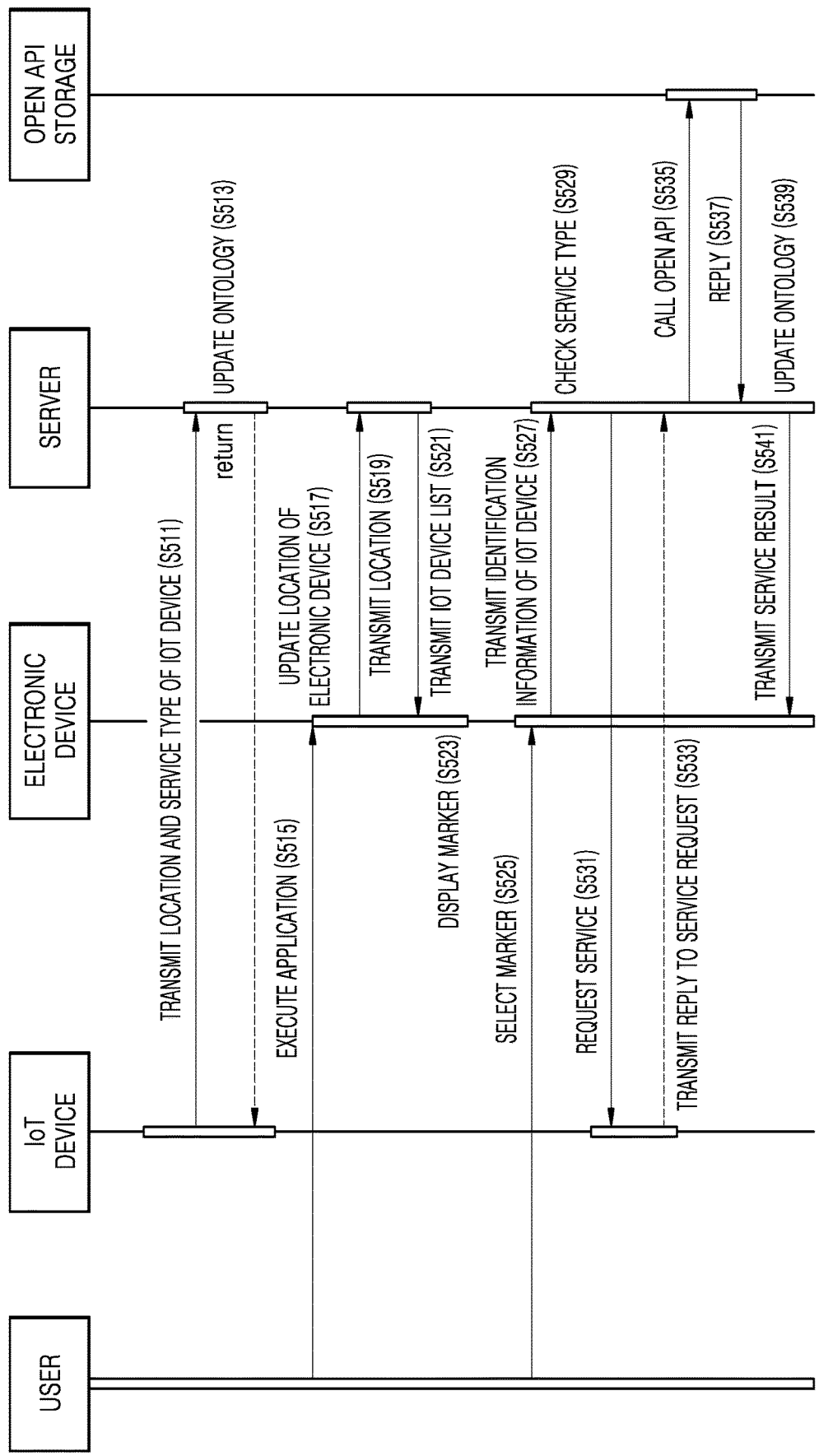
FIG. 5 is a flowchart of a system for providing the service related to the IoT device according to an exemplary embodiment.

FIG. 5 is a flowchart of a system for providing a service related to the IoT device 430 according to an exemplary embodiment.

In operation S511, the IoT device 430 may transmit to the server 200 the location and the service type of the IoT device 430 (S511).

In operation S513, the server 200 may update the ontology based on the location and the service type of the IoT device 430 (S513). In detail, the server 200 may update the IoT device information which includes the location and the service type of the IoT device 430.

Thereafter, in operation S515, the electronic device 100 may receive from the user an input for executing an application to provide the service related to the IoT device 430 (S515).

In operation S517, the electronic device 100 may update the location of the electronic device 100 (S517). The location of the electronic device 100 may include altitude, latitude, and longitude. In addition, the location of the electronic device 100 may include the bearing of the electronic device 100.

In operation S519, the electronic device 100 may transmit the location of the electronic device 100 to the server 200 (S519).

In operation S521, the server 200 may transmit the IoT device list to the electronic device 100 (S521). For example, the server 200 may transmit to the electronic device 100 the IoT device list which has been determined based on the location of the electronic device 100 and the IoT device information, in response to having received the location of the electronic device 100.

In operation S523, the electronic device 100 may display the marker (S523). For example, the electronic device 100 may display the marker in the area corresponding to the location of the IoT device 430 included in the IoT device list, in response to having received the IoT device list.

In operation S525, the electronic device 100 may receive an input for selecting the marker from the user (S525).

In operation S527, the electronic device 100 may transmit to the server 200 the identification information of the IoT device 430 (S527).

In operation S529, the server 200 may check the service type of the IoT device 430, in response to the received identification information of the IoT device 430 (S529).

In operation S531, the server 200 may transmit the service request to the IoT device 430 (S531).

In operation S533, the IoT device 430 may transmit a reply to the service request to the server 200 (S533).

In operation S535, the server 200 may call for the OPEN API (S535). In addition, in operation S537, the OPEN API storage 440 may provide the OPEN API, in response to the call for the OPEN API (S537).

In operation S539, the server 200 may update the ontology (S539). In detail, the server 200 may update the IoT device information based on the reply to the service request which has been received from the IoT device 430.

In operation S541, the server 200 may transmit the service result to the electronic device 100 (S541). For example, the server 200 may transmit the service result based on the reply to the service request which has been received from the IoT device 430.

Figure 6:
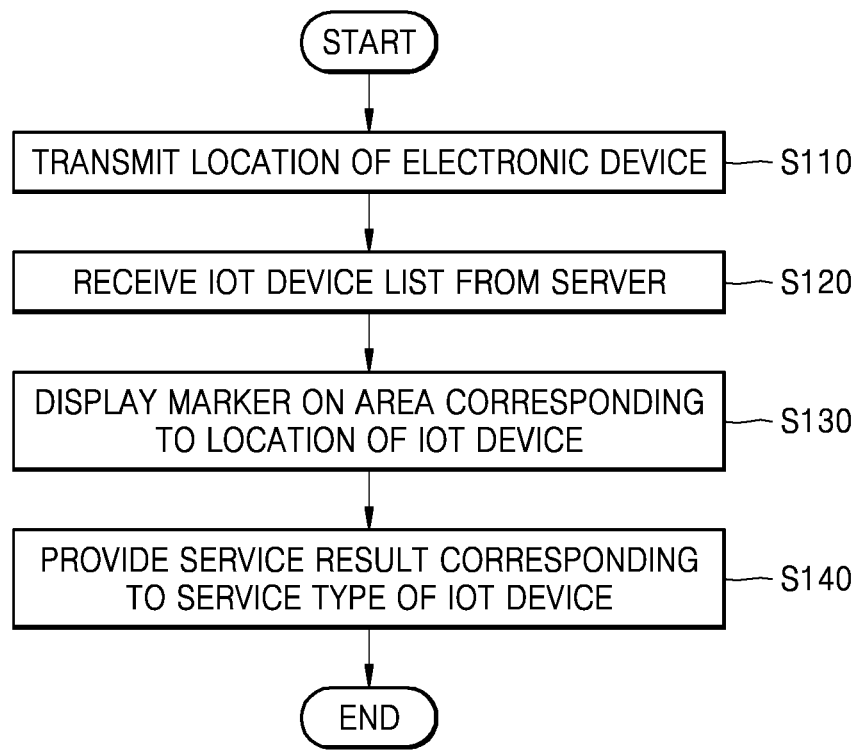
FIG. 6 is a flowchart of a method of processing in the electronic device 100 according to an exemplary embodiment.

FIG. 6 is a flowchart of a processing method in the electronic device 100 according to an exemplary embodiment.

In operation S110, the electronic device 100 may transmit the location of the electronic device 100 to the server 200 (S110). In addition, the electronic device 100 may transmit the location of the electronic device 100 to the IoT device.

In operation S120, the electronic device 100 may receive the IoT device list from the server 200 (S120). The IoT device list may have been determined based on the location of the electronic device 100.

In operation S130, the electronic device 100 may display the marker in the area corresponding to the location of the IoT device (S130). The electronic device 100 may display the marker in the area corresponding to the location of the IoT device included in the IoT device list.

In operation S140, the electronic device 100 may provide the service result corresponding to the service type of the IoT device (S140). The electronic device 100 may provide the service result corresponding to the service type of the IoT device based on the input for selecting the marker.

Figure 7:
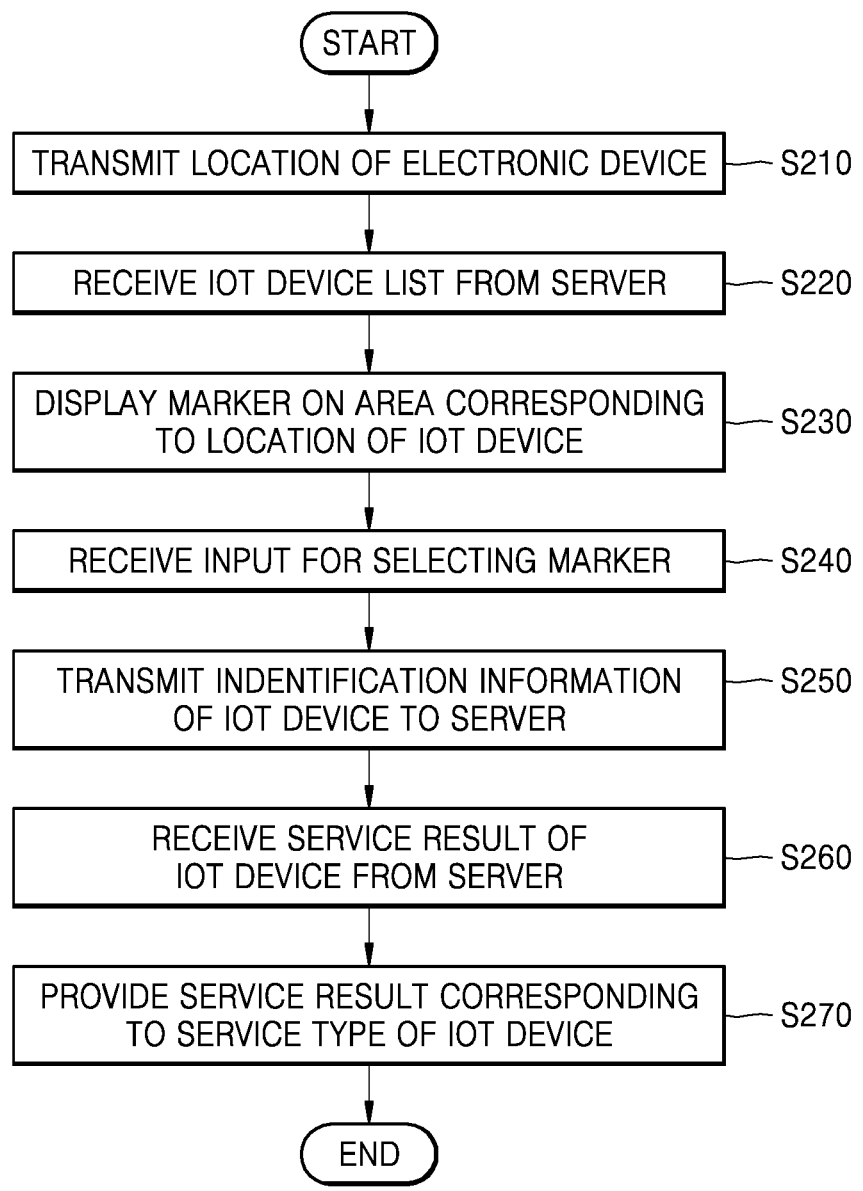
FIG. 7 is another flowchart of a method of processing in the electronic device 100 according to an exemplary embodiment.

FIG. 7 is another flowchart of a method of processing in the electronic device 100 according to an exemplary embodiment.

Operations S210, S220, and S230 respectively correspond to operations S110, S120, and S130 described in FIG. 6 and descriptions of them will be omitted.

In operation S240, the electronic device 100 may receive the input which selects the marker (S240).

In operation S250, the electronic device 100 may transmit the identification information of the IoT device to the server 200 (S250). For example, the electronic device 100 may transmit to the server 200 the identification information of the IoT device corresponding to the selected marker based on the input which selects the marker.

In operation S260, the electronic device 100 may receive the service result of the IoT device from the server 200 (S260).

In operation S270, the electronic device 100 may provide the service result corresponding to the service type of the IoT device (S270).

Figure 8:
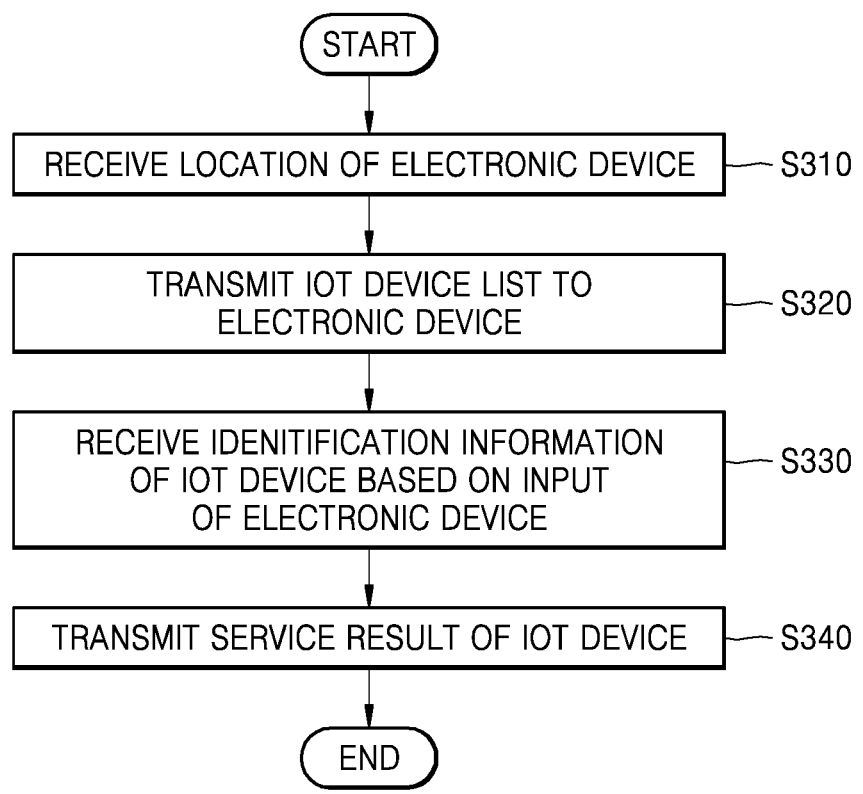
FIG. 8 is a flowchart of a method of processing in the server 200 according to an exemplary embodiment.

FIG. 8 is a flowchart of a processing method in the server 200 according to an exemplary embodiment.

In operation S310, the server 200 may receive the location of the electronic device 100 (S310).

In operation S330, the server 200 may transmit the IoT device list to the electronic device 100 (S320). The server 200 may transmit to the electronic device 100 the IoT device list which has been determined based on the location of the electronic device 100 and the IoT device information, in response to having received the location of the electronic device 100 from the electronic device 100.

In operation S330, the server 200 may receive the identification information of the IoT device based on the input of the electronic device 100 (S330). The server 200 may receive the identification information of the IoT device based on the input of the electronic device 100, for selecting the marker corresponding to the IoT device.

In operation S340, the server 200 may transmit the service result of the IoT device (S340). The server 200 may transmit to the electronic device 100 the service result corresponding to the service type of the IoT device, in response to having received the identification information of the IoT device from the electronic device 100.

Figure 9:
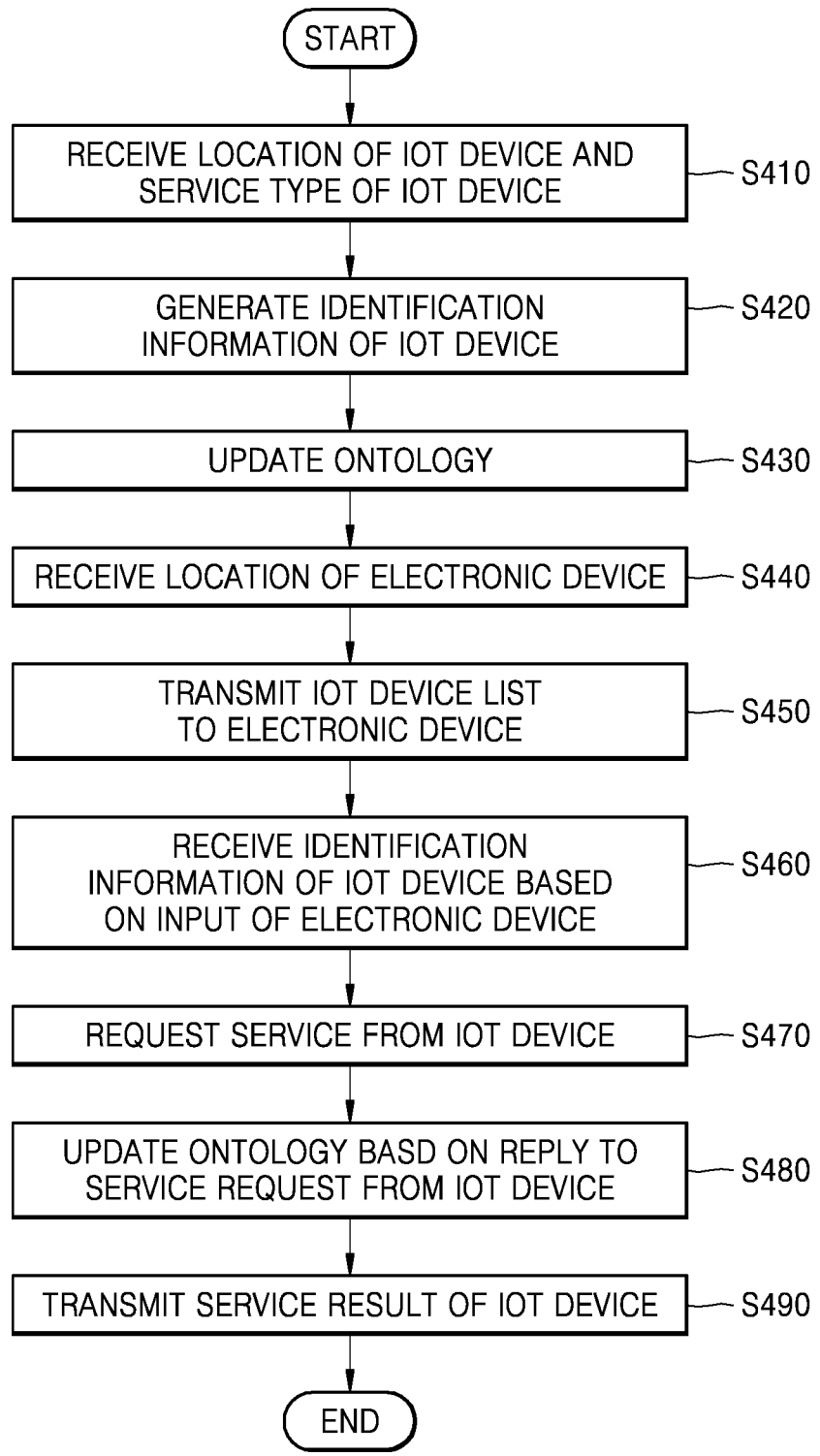
FIG. 9 is another flowchart of a method of processing in the server 200 according to an exemplary embodiment.

FIG. 9 is another flowchart of a processing method in the server 200 according to an exemplary embodiment.

In operation S410, the server 200 may receive the location of the IoT device and the service type of the IoT device (S410).

In operation S420, the server 200 may generate the identification information of the IoT device (S420).

In operation S430, the server 200 may update the ontology (S430). The ontology may correspond to the IoT device information, which includes the generated identification information, the location of the IoT device which has been received from the IoT device, and the service type of the IoT device. The server 200 may store the IoT device information which includes the location, the service type, etc., to provide the service corresponding to the service type of the IoT device.

Operations S440, S450, and S460 respectively correspond to operations S310, S320, and S330 described in FIG. 8 and descriptions of them will be omitted.

In operation S470, the server 200 may transmit the service request to the IoT device (S470).

In operation S480, the server 200 may update the ontology based on the reply to the service request from the IoT device (S480). For example, updating the ontology may be updating the IoT device information stored in the server 200.

In operation S490, the server 200 may transmit the service result of the IoT device (S480). The server 200 may transmit to the electronic device 100 the service result of the IoT device based on the updated IoT device information.

Figure 10A:
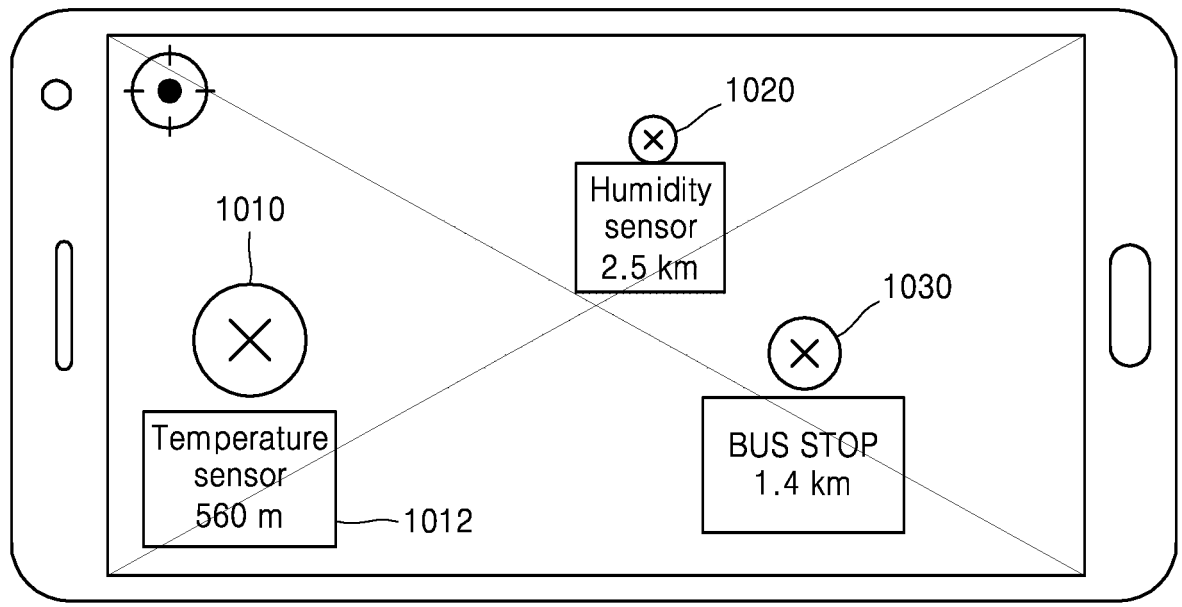
FIG. 10A illustrates displaying markers in areas corresponding to locations of the IoT devices according to an exemplary embodiment.

FIG. 10A illustrates displaying markers in areas corresponding to locations of IoT devices according to an exemplary embodiment.

Referring to FIG. 10A, the electronic device 100 may display markers 1010, 1020, and 1030 in areas corresponding to locations of the IoT devices included in the IoT device list. For example, the IoT devices included in the IoT device list may be a temperature sensor, a humidity sensor, and a bus stop. The electronic device 100 may display markers corresponding to all of the IoT devices included in the IoT device list. In addition, the electronic device 100 may display markers only for a portion of the IoT devices included in the IoT device list. The electronic device 100 may display markers for a portion of the IoT devices depending on the selected service types.

In addition, the electronic device 100 may provide data about the IoT device along with markers. For example, the data 1012 for the IoT device may denote that the IoT device is a temperature sensor and that the distance of the IoT device with respect to the electronic device 100 is 560 m. For example, the electronic device 100 may provide the data 1012 about the IoT device based on the IoT device list.

Figure 10B:
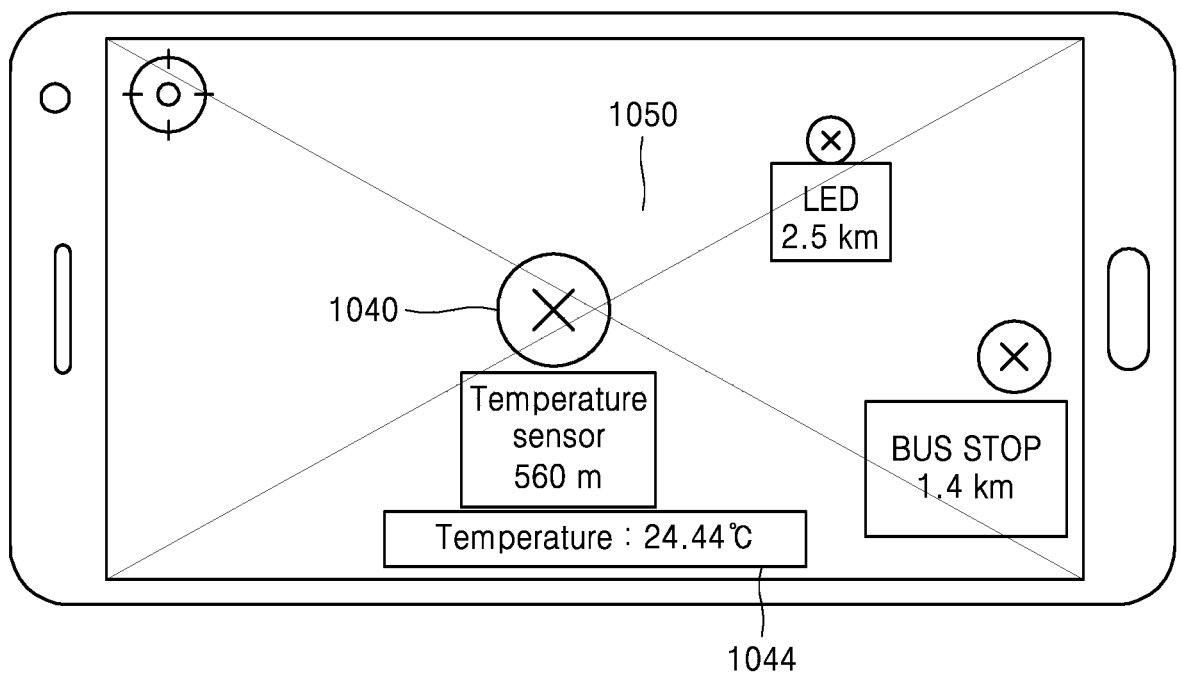
FIG. 10B illustrates providing services related to the IoT devices according to an exemplary embodiment.

FIG. 10B illustrates providing a service related to an IoT device according to an exemplary embodiment.

The electronic device 100 may provide the service result 1044 of the IoT device. Referring to FIG. 10B, the IoT device may be a temperature sensor and the service type provided by the IoT device may be the information generation service.

The service result 1044 may include at least one of information generated by the IoT device, information provided by the IoT device, and the status information of the IoT device. Referring to FIG. 10B, the electronic device 100 may provide the service result 1044 which includes the ambient temperature measured at the temperature sensor, that is, the information generated by the IoT device.

Figure 11:
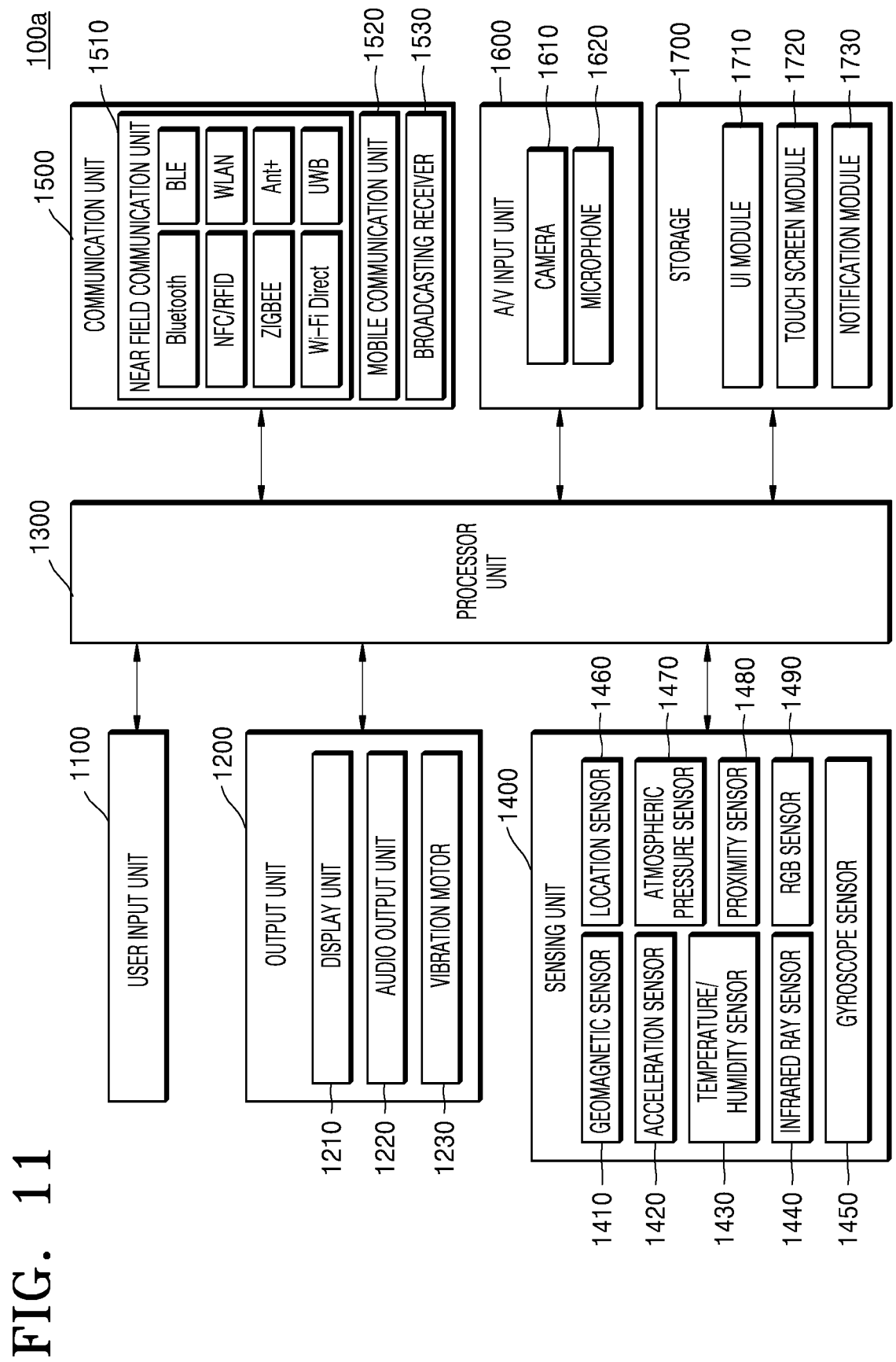
FIG. 11 is a block diagram of the electronic device 100a according to an exemplary embodiment.

FIG. 11 is a block diagram of the electronic device 100*a* according to an exemplary embodiment.

As illustrated in FIG. 11, the electronic device 110*a* may further include a sensing unit 1400, e.g., a sensor, an audio/video (A/V) input unit 1600, and a memory 1700 in addition to a user input unit 1100, e.g., a user input, an output unit 1200, i.e., an output, a controller 1300, and a communication unit 1500, e.g., a communicator, according to an exemplary embodiment.

The user input unit 1100 may denote a tool by which the user inputs data to control the electronic device 100*a*. For example, the user input unit 1100 may include a key pad, a dome switch, a touch pad (a contact type capacitive method, a pressure-type resistive method, an infrared ray detection method, an surface ultrasonic conductivity method, an integral equation type tension measurement method, a piezoelectric effect method, etc.), a jog wheel, a jog switch, etc.; however, one or more exemplary embodiments are not limited thereto.

The user input unit 1100 may receive an input of a password from the user. The user input unit 1100 may also receive an input of a type of the password to be inputted by the user.

The output unit 1200 may output an audio signal, a video signal or a vibration signal, and the output unit 1200 may include a display unit 1210, an audio output unit 1220, and a vibration motor 1230.

The display unit 1210 may display information processed in the electronic device 100.

When the display unit 1210 and the touch pad make the touch screen in a layer structure, the display unit 1210 may be used as an input device in addition to as an output device. The display unit 1210 may include at least one of a liquid crystal display, a thin film transistor-liquid crystal display, an organic light-emitting diode, a flexible display, a three-dimensional display, and an electrophoretic display. In addition, the electronic device 100*a* may include two or more display units 1210 depending on a realization type of the electronic device 100*a*. In this case, two or more display units 1210 may face each other via a hinge.

The display unit 1210 of FIG. 11 may include the display unit 120 described in FIG. 1.

The audio output unit 1220 may output audio data that is received from the communication unit 1500 or stored in the memory 1700. In addition, the audio output unit 1220 may output an audio signal related to functions processed in the electronic device 100*a* (for example, a call signal receiving sound, a message receiving sound, and a notification sound). Such audio output unit 1220 may include a speaker, a buzzer, etc.

The vibration motor 1230 may output the vibration signal. For example, the vibration motor 1230 may output the vibration signal corresponding to an output of audio data or video data (for example, the call signal receiving sound, the message receiving sound, etc.) In addition, the vibration motor 1230 may output the vibration signal when a touch is inputted onto the touch screen.

The controller 1300 may conventionally control an overall operation of the electronic device 100*a*. For example, the controller 1300 may generally control the user input unit 1100, the output unit 1200, the sensing unit 1400, the communication 1500, the A/V input unit 1600, etc. by executing programs stored in the memory 1700.

The controller 1300 of FIG. 11 may include the controller 110 described in FIG. 1.

The sensing unit 1400 may detect a status of the electronic device 100*a* or an ambient status of the electronic device 100*a*, and transfer detected information to the controller 1300.

The sensing unit 1400 may include at least one of a geomagnetic sensor 1410, an acceleration sensor 1420, a temperature/humidity sensor 1430, an infrared ray sensor 1440, a gyroscope sensor 1450, a location sensor 1460 (for example, a global positioning system (GPS)), an atmospheric pressure sensor 1470, a near field sensor 1480, and a red-green-blue (RGB) sensor (illuminance sensor); however, one or more exemplary embodiments are not limited thereto. Since functions of respective sensors may be intuitively inferred and detailed descriptions will be omitted.

The communication unit 1500 may include at least one of components which enable communication between the electronic device 100*a* and an external device or between the electronic device 100*a* and a server. For example, the communication unit 1500 may include a short-range wireless communication unit 1510, e.g., a short-range wireless communicator, a mobile communication unit 1520, e.g., a mobile communicator, and a broadcasting receiver 1530.

The short-range wireless communication unit 1510 may include a bluetooth communication unit, e.g., a bluetooth communicator, a bluetooth low energy (BLE) communication unit, e.g., a BLE communicator, a near field communication unit, e.g., a near field communicator, a wireless local area network (WLAN) or WiFi communication unit, e.g., a WLAN or WiFi communicator, a Zigbee communication unit, e.g., a Zigbee communicator, an infrared data association (IrDA) communication unit, e.g., a IrDA communicator, a Wi-Fi Direct (WFD) communication unit, e.g., a WFD communicator, an ultra wideband (UWB) communication unit, e.g., a UWB communicator, an Ant+ communication unit, e.g., an Ant+ communicator, etc.; however, one or more exemplary embodiments are not limited thereto.

The mobile communication unit 1520 may transceive wireless signals to and from at least one of a base station, an external terminal, and a server on a mobile communication network. The wireless signals may include various types of data per transceiving audio call signals, video communication call signals or text/multimedia messages.

The broadcasting receiver 1530 may receive broadcasting signals and/or information related to broadcasting from the outside via broadcasting channels. The broadcasting channels may include satellite channels and ground wave channels. Depending on a type of realization, the electronic device 100a may not include the broadcasting receiver 1530.

In addition, the communication unit 1500 may transceive data needed for providing hints by using the user's biometric information, to and from the user's external device or a server.

The audio/video (A/V) input unit 1600 is to input audio signals or video signals, and may include a camera 1610, a microphone 1620, etc. The camera 1610 may acquire image frames such as stationary images or video images via an imaging device at a video call mode or a shooting mode. Images captured by the imaging device may be processed via a controller 1300 or a separate image processor.

The image frames processed in the camera 1610 may be stored in the memory 1700 or transmitted to the outside via the communication unit 1500. Two or more cameras 1610 may be included depending on a type of a terminal.

The microphone 1620 may receive an input of external audio signals and process it into electrical audio data. For example, the microphone 1620 may receive audio signals from the external device or a speaker. The microphone 1620 may use various noise removing algorithms for removing noise which is generated in a process of receiving an input of the external audio signals.

The memory 1700 may store programs for processing and controlling of the controller 1300, and store data also that is inputted into the electronic device 100a or outputted from the electronic device 100a.

The memory 1700 may include at least one type of storing media such as a flash memory, a hard disk, a multimedia micro-card, a card type memory (for example, secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules per function and may be, for example, a user interface (UI) module 1710, a touch screen module 1720, a notification module 1730, etc.

The UI module 1710 may provide specialized UI, graphic UI (GUI), etc., which are linked to the electronic device 100a per application. The touch screen module 1720 may sense the user's touch gesture on the touch screen and transmit information about the touch gesture to the controller 1300. According to an exemplary embodiment, the touch screen module 1720 may recognize and analyze a touch code. The touch screen module 1720 may be composed of separate hardware including the controller.

Various sensors may be arranged inside or near the touch screen for detecting the touch on the touch screen or a close touch. A tactile sensor is an example of a sensor for detecting the touch on the touch screen. The tactile sensor may sense the touch of a particular object at a level of human feeling or at a higher level than that. The tactile sensor may detect various pieces of information such as roughness of a contact surface, hardness of a contact material, and temperature of a contact point.

In addition, the proximity sensor is another example of sensors for detecting the touch on the touch screen. The proximity sensor is a sensor which detects an existence of an object approaching a certain detection surface or an object in the vicinity, without a mechanical contact, via an electromagnetic force or infrared rays. Examples of the proximity sensors are a transparence-type photoelectric sensor, a direct reflection-type photoelectric sensor, a mirror reflection-type photoelectric sensor, a high-frequency oscillation-type proximity sensor, a capacitance-type proximity sensor, a magnet-type proximity sensor, and an infrared ray proximity sensor. Various touch gestures of the user may include a tap, a touch and hold, a double tap, a drag, a fanning, a flick, a drag and drop, a swipe, etc.

The notification module 1730 may generate a signal to notify an event occurrence of the electronic device 100a. Examples of events generated in the electronic device 100a may include receiving a call signal, receiving a message, an input of key signals, and a schedule notification. The notification module 1730 may output the notification signal in a video signal-type via the display unit 1210 or in an audio signal-type via the audio output unit 1220, or in a vibration signal-type via the vibration motor 1230.

According to an exemplary embodiment, a display method may be realized in a program code-type executable via various computer methods and may be recorded on a non-transitory computer readable medium. The non-transitory computer readable medium may include program codes, data files, data structures, etc., separately or in combinations. Program codes to be recorded on such medium can be particularly designed and configured according to the inventive concept, or any readily available medium publically known to one of ordinary skill in the art of computer software may be used. Examples of the non-transitory computer readable recording media may include a hard disk, a magnetic medium such as a floppy disk and a magnetic tape, an optical medium such as a CD-ROM and a DVD, a magneto-optical medium such as a floptical disk, and a hardware apparatus, specially configured to store and execute program commands, such as a ROM, a RAM, and a flash memory. Examples of program codes may include not only machine language codes generated by a compiler but also high level language codes executable by the computer via an interpreter, etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. An electronic device for providing a service related to an internet of things (IoT) device, the electronic device comprising:

a display; and a controller configured to:

transmit a location of the electronic device to a server, and receive, from the server, an IoT device list determined based on IoT device information stored in the server and the location of the electronic device, control the display to display a live-view image currently acquired by a camera of the electronic device, display, with the live-view image, a corresponding marker indicating an IoT device, which is different from the electronic device, included in the IoT device list, on an area of the live-view image corresponding to a position of the IoT device within the live-view image,
display an area for selecting the marker on the live-view image, and
provide a service result corresponding to a service type of the IoT device based on an input for selecting the marker,
wherein the input for selecting the marker comprises a movement of the electronic device which causes the marker to remain inside the area for selecting the marker.

2. The electronic device of claim 1,
wherein the IoT device information comprises the location of the IoT device and the service type of the IoT device.

3. The electronic device of claim 1, wherein the controller is further configured to, when the service type comprises an information generation service or an information utilization service, control the display to display information that is generated or provided by the IoT device.

4. The electronic device of claim 1, wherein the controller is further configured to, when the service type comprises a control service, control the display such that at least one of buttons is displayed for receiving a request for current status information of the IoT device and the control service.

5. The electronic device of claim 1, wherein the controller is further configured to:
transmit identification information of the IoT device to the server, and
receive, from the server, the service result of the IoT device, and
wherein the service result comprises at least one of information generated by the IoT device, information provided by the IoT device, and status information of the IoT device.

6. The electronic device of claim 1, wherein the IoT device list comprises at least one of locations of the IoT device located in a vicinity of the electronic device, identification information of the IoT device, the service type of the IoT device, information utilized by the IoT device, and status information of the IoT device.

7. The electronic device of claim 1, wherein the live-view image corresponds to a surrounding area of the electronic device.

8. The electronic device of claim 1, wherein the area for selecting the marker is located at a fixed location on the display, and
wherein the fixed location is a center location of the display.

9. A method of providing a service related to an internet of things (IoT) device, the method comprising:
transmitting, to a server, a location of an electronic device;
receiving, from the server, an IoT device list that is determined based on IoT device information stored in the server, and the location of the electronic device; and
controlling a display to:
display a live-view image currently acquired by a camera of the electronic device; and
display, with the live-view image, a corresponding marker indicating an IoT device, which is different from the electronic device, included in the IoT device list, on an area of the live-view image corresponding to a position of the IoT device within the live-view image;
display an area for selecting the marker on the live-view image, and
providing a service result corresponding to a service type of the IoT device based on an input for selecting the marker,
wherein the input for selecting the marker comprises a movement of the electronic device which causes the marker to remain inside the area for selecting the marker.

10. The method of claim 9,
wherein the IoT device information comprises the location of the IoT device and the service type of the IoT device.

11. The method of claim 9, wherein the providing comprises controlling, when the service type comprises an information generation service or an information utilization service, the display to display information that is generated or provided by the IoT device.

12. The method of claim 9, wherein the providing comprises controlling, when the service type comprises a control service, the display such that at least one of buttons is displayed for receiving a request for current status information of the IoT device and the control service.

13. The method of claim 9, wherein the providing comprises:
transmitting identification information of the IoT device to the server; and
receiving the service result of the IoT device from the server, and
wherein the service result comprises at least one of information generated by the IoT device, information provided by the IoT device, and state information of the IoT device.

14. The method of claim 9, wherein the IoT device list comprises at least one of the location of the IoT device that is located in a vicinity of the electronic device, identification information of the IoT device, the service type of the IoT device, information used by the IoT device, and state information of the IoT device.

15. A non-transitory computer readable recording medium having recorded thereon a program for executing on a computer the method of claim 9.

16. The method of claim 9, wherein the live-view image corresponds to a surrounding area of the electronic device.

* * * * *